United States Patent Office 3,383,678
Patented May 14, 1968

3,383,678
MOVING OBJECT DETECTION SYSTEM
James L. Palmer, Cupertino, Calif., assignor to Advanced Devices Laboratory, Inc., San Jose, Calif., a corporation of California
Filed Dec. 23, 1966, Ser. No. 604,430
24 Claims. (Cl. 343—5)

ABSTRACT OF THE DISCLOSURE

A Doppler system moving object detector, such as may be employed for protecting a specific volume under surveillance from intruders, which is sensitive only to a selected class of objects and then only when such objects move with a velocity within a selected range in the specific volume. The moving object detector employs a wave energy transceiver for generating a Doppler signal when the wave energy is reflected from a moving object, filters for rejecting Doppler signals other than those naturally attributable to objects moving within a selected velocity range, memory devices to rejected Doppler signals other than those naturally attributable to objects with a selected class and various self-testing means for operation assurance.

BACKGROUND OF THE INVENTION

Field of the invention

This invention relates to a moving object detection system, and, more particularly, to a Doppler system which is sensitive only to objects which belong to a selected class of objects and which move with a velocity within a selected range of velocities. The moving object detection system of this invention is highly suitable as an intruder detection system when its effective radiation field covers the special volume to be protected against intruders, such as a room, building, or the perimeter area surrounding one or more buildings, and which gives an alarm in response to sensing an intruder.

Description of the prior art

Doppler systems, using either electromagnetic or acoustical wave energy to detect the presence of a moving object, are well-known in the art. These systems utilize a radiator which radiates wave energy into the area or in the direction in which the moving object is to be detected, and a receiver which simultaneously receives the wave energy reflected from the moving object and a portion of the radiated wave energy. The reflected wave energy and the radiated wave energy are mixed with one another and if one of these two signals is of a different frequency from the other, as would result from the Doppler effect from the movement of the object which reflects the wave energy, the difference of the frequencies is obtained in the form of a Doppler signal at the output of the mixer.

The basic deficiency with Doppler systems known heretofore is their lack of discrimination when it is desired to make the detection system sensitive to one type of moving objects and insensitive to all other types of moving objects or certain other causes. This is particularly true for intruder detection systems where it is desired to raise an alarm only in response to an intruder. It has been found that, in prior art intruder detection systems of this type, the alarm is set off by causes such as scurrying small animals, vibration of enclosure walls caused by traffic and the like, operating fans, high frequency lighting, electrical discharges, and many other causes.

Heretofore many attempts have been made to obtain discrimination against setting off the detection system by causes other than the desired class of objects. For example, U.S. Patent 3,242,486 discloses an intruder detection system having a discrimination means in the form of an amplitude discriminator followed by a Schmitt trigger. The amplitude discriminator prevents the application of the Doppler signals below a certain threshold amplitude from actuating the Schmitt trigger, the rationale being that an intruder presents a larger area to the radiation than a small animal and, therefore, reflects more of the radiation and provides a larger amplitude Doppler signal. By discriminating against small amplitude Doppler signals, the detection system becomes insensitive to small animals. While this system certainly provides discrmiination against small moving objects, it is non-discriminatory against many other causes and, therefore, subject to be triggered by causes other than intruders.

Another basic deficiency with Doppler systems known heretofore is their lack of discrimination when it is desired to make the detection system sensitive to objects moving within a selected range of velocities, but insensitive to all objects whose velocity (in the general direction of the antenna) is outside the selected range. This is likewise applicable to intruder detection systems. For example, in the surveillance of the perimeter of a factory or a security installation located near a highway, the moving vehicle does not present a potential intruder, whereas a person on foot does. None of the Doppler systems of the prior art are capable of distinguishing between fast moving vehicle traffic and persons on foot.

SUMMARY OF THE INVENTION

The moving object detection system of the present invention utilizes the Doppler system of detecting moving objects and overcomes the deficiencies of the prior art by including a Doppler signal processing means for discriminating against signals that do not fall within a prescribed narrow bandwidth and which, in addition, do not have certain specific modulation characteristics of frequency, amplitude and duration, such as are not normally characteristic of objects which belong to a selected class and which moves with velocities (towards or away from the source of radiation) within a selected range of velocities.

The moving object detection system of the present invention discriminates against motion of objects such as people, animals, motor vehicles, etc., and against spurious signals such as electrical discharges, lighting, etc., which are located outside a specific volume in which detection of moving objects is desired by the use of sharply defined patterns of radiation of the transmitted energy and of reception of the reflected energy. The transmitting and receiving means are designed with radiation and reception patterns, and the transmitting and receiving transducers are located so as to produce a precisely defined volume in which overlap of the patterns occurs, and it is the motion of objects within this overlapping volume, and only within this overlapping volume, that will be detected by the system. Furthermore, since the reception pattern of the receiver is confined in general to the overlapping volume in which motion detection is desired, the system discriminates against spurious signals either natural or man made which originate outside the chosen volume. The system, therefore, does not depend upon the presence of walls, ceiling, or floor to confine the volume in which motion detection is desired; however, in practice such natural barriers may be used to assist in confining the volume of coverage.

The moving object detection system of this invention incorporates a receiver having a narrow response bandwidth which is centered at the transmitter frequency. The receiver exhibits a flat response to signals over a frequency band just wide enough to include the transmitter frequency as it may vary under extremes of environment such as temperature and line voltage variations, etc. This narrow bandwidth is, however, wide compared to the Doppler frequency shift due to the motion of an intruder. Outside this narrow bandwidth the response of the receiver decreases very rapidly. The receiver thereby discriminates against spurious signals at frequencies outside this narrow response bandwidth. This discrimination acts principally against spurious signals due to external disturbances either natural or man made such as electrical discharges, radar, powerful radio transmitters, etc.

The moving object detection system also incorporates a Doppler system processing means which includes a frequency discriminator means in the form of a bandpass filter which has a pass band to only pass Doppler signals having a frequency corresponding to bodies moving with velocities parallel to the radiation (or substantially so) within said selected range. This provides effective discrimination against all objects having velocities which are outside said selected range, such as vibrations. As applied to intruders, it has been determined that an intruder on foot moves generally within the velocity range of about one-half to three feet per second.

The processing means further includes an amplitude limiting means which limits the amplitude of the Doppler signal to a first maximum level by clipping to thereby discriminate against spurious signals, usually in the form of transients, caused by electrical discharges, to prevent such spurious signals from having an effect greater than a normal signal.

The processing means further includes an accumulator means which is charged by the Doppler signal, and an amplitude discriminator means which passes only signals above a second or minimum level which is below the maximum level. The accumulator means discriminates against spurious or non-recurring signals which normally are not produced by a moving object by selecting the accumulator leakage or discharge rate such that its charging rate due to Doppler signals of the frequency corresponding to the selected range of velocities is greater than its discharge rate. In this manner, a transient signal will not trigger the alarm. The amplitude discriminator means is responsive to the accumulated energy, and passes only signals of the minimum amplitude after the accumulator means has been charged up to a selected level. Only signals passed by the amplitude discriminator means can trigger the detection alarm, and there is complete assurance that the alarm is due to objects falling within a selected class and having a velocity within a selected range.

The processing means further includes an automatic noise compensator means which integrates or averages the energy stored in the accumulator by noise or a continuous low amplitude signal over a time period which is long compared to the charging time and which average level automatically produces an adjustment of the quiescent level of the accumulator to a preselected level which is established in the absence of any noise or continuous low amplitude signal. The automatic noise compensator discriminates against spurious noise and continuous signals, either natural or man made, having an amplitude and duration which are in themselves insufficient to charge the accumulator to the alarm trigger level, but which in the absence of the automatic noise compensator would cause a partial charging of the accumulator, thereby reducing the energy required to charge the accumulator by the motion of an intruder or by a transient signal, and hence would cause an increase in sensitivity of the moving object detection system.

The moving object detection system of this invention further includes two independent supervisory alarm actuator circuits which continuously monitor the performance of the system and which actuate the alarm trigger whenever certain characteristics of the performance are not satisfied. These two supervisory circuits have no effect on system performance so long as the chosen characteristics are satisfied.

The first supervisory alarm actuator compares the level of energy stored in the accumulator with the output of the automatic noise compensator, and these two voltages will differ because of inherent system noise so long as all elements of the system function properly. The alarm trigger is actuated whenever these two voltages do not differ since such a condition is caused by the absence of inherent system noise which occurs whenever the system is rendered inoperative by the failure of one of its elements.

The second supervisory alarm actuator monitors the signal level of the transmitted energy at the input to the receiver. The alarm trigger is actuated by this circuit whenever the transmitted signal level at the input to the receiver falls below a preset level, a condition caused by failure of the transmitter or the signal detection means at the input to the receiver. The first supervisory circuit supervises the performance of the entire system, whereas the second supervisory circuit supervises only two major elements, the transmitter and signal detection means at the input to the receiver.

The moving object detection system of this invention incorporates a unique motion simulator which introduces, when energized, a small modulation amplitude on the transmitted energy arriving at the receiver, said modulation having a frequency in the same range as the Doppler frequency range corresponding to the motion of objects for which detection is desired, and having an amplitude which is adjusted for each setting of the range control to just cause triggering of the alarm. The motion simulator, when energized, thereby provides not only a qualitative test of the entire system, but also a quantitative test since a reduction in transmitter energy or receiver detector and amplifier sensitivity will prevent the intruder simulator from triggering the alarm.

DESCRIPTION OF THE PREFERRED EMBODIMENT

While the moving object detection system of this invention will be described in connection with an intruder detection system, in which the moving object is a person on foot, it is to be understood that the invention may be applied to the detection of moving objects other than intruders on foot, such as, for example, land, sea, air, underwater and space vehicles; wildlife and fish; parts on assembly lines and the like, and that proper discrimination can be made to make the detection selective to a small or large class of such selected objects with proper selection based on characteristics, such as size, distance from receiver, velocity, reflectivity and shape.

Further, even though the ensuing description makes use of an electromagnetic wave energy Doppler system, the invention can likewise be practiced with an acoustical wave energy Doppler system as will become immediately understood by those skilled in the art. The output signal from an acoustical wave Doppler system is an electrical signal much like the one derived from a radar Doppler system, and the Doppler signal discrimination means of the invention is equally applicable to both.

Figure 1:
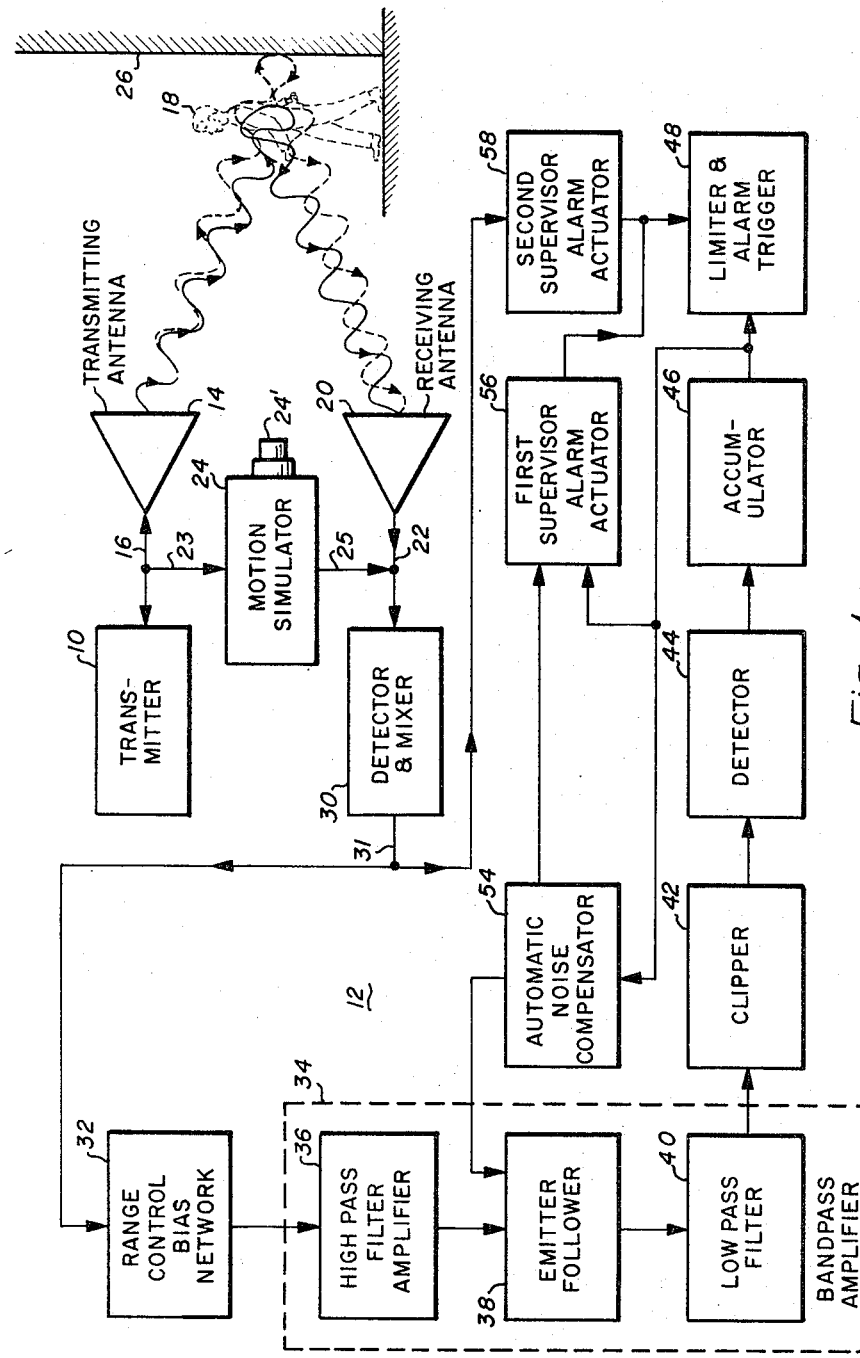
FIGURE 1 is a functional block diagram of the moving object detection system of this invention.

The moving object detection system shown in FIGURE 1 comprises a transmitter 10 and a receiving system generally indicated by reference numeral 12. The output signal from transmitter 10 is connected to a transmitting antenna 14 through a transmission line 16, and the radiated wave energy is shown, by way of example, impinging upon a moving object, such as an intruder 18, which reflects a portion thereof for pick-up by receiving antenna 20. Antenna 20 is connected to receiving system 12 through a suitable transmission line 22. Transmission line 22 is also coupled to transmission line 16 through a coupling link including transmission lines 23 and 25 and and motion simulator 24 therebetween so that receiver 12, in addition to receiving the wave energy reflected by target 18, also receives a portion of the wave energy radiated by antenna 14. Motion simulator 24, when not activated, provides a straight through path coupling transmission lines 23 and 25 together, and may be activated by means of a push button switch, such as is diagrammatically shown at 24'.

If the intruder detector system of this invention is positioned so that the radiation impinges upon a wall or some other reflective structure, as would be the case in an enclosed space, receiver 12 will also receive the radiation from the wall as indicated at 26. It will be readily understood by those skilled in the art that in such a case, couplings 23–25 may be dispensed with in practicing the instant invention because receiver 12 now receives a portion of the radiated wave energy by reflection, i.e., without a frequency shift, and the wall performs the function of the coupling means. However, the preferred embodiment of this invention utilizes a coupler for the direct transfer of the radiated wave energy which has the advantage of setting a definite level against which the amount of energy reflected from a moving target can be compared for amplitude discrimination.

In accordance with the preferred embodiment of the invention the intruder detection system is operated with electromagnetic energy. The change in the frequency due to the Doppler effect is given by the following well-known equation where $\Delta F$ is the change of frequency in Hz., $f_0$ is the frequency of the electromagnetic radiation from the antenna, $V_E$ is the velocity of the electromagnetic waves in air, and $V_T$ is the velocity component along the direction of radiation of the moving object:

$$\Delta F = (2f_0/V_E)V_T$$

Even though antennas 14 and 20 are separated by a small distance and $V_T$ cannot be parallel to both the radiated and reflective energy, $V_T$ may be taken, for all practical purposes, as substantially equal to the motion of intruder 18 in a direction which is substantially perpendicular to the plane of the antenna pair. Using the approximate value of $10^9$ feet per seconds as the velocity of light, and a radiation frequency of 10,000 mHz., the change of frequency due to the Doppler effect will be equal to 20 $V_T$ Hz./ft./sec. Since it has been found that a person entering a protected area usually moves with a velocity between one-half and three feet per second, the frequency of the Doppler signal corresponding to this range of velocities is between 10 Hz. and 60 Hz.

Receiving system 12 includes a detector (mixer) 30 having a narrow RF bandwidth which provides an output signal on lead 31 having a frequency corresponding to the difference in the frequencies of the radiated and reflected wave energy, and an amplitude corresponding to the vector sum of the amplitudes of the reflected and radiated wave energy as received by mixer 30. The RF bandwidth of detector 30 is made just wide enough to maintain a flat response during normally anticipated frequency variations in the transmitted signal. It has been found in practice that for an operating frequency of approximately 10,000 mHz., the transmitted frequency can readily be maintained constant within 10 mHz. for all variations in power line voltage, temperature, aging, etc., and, therefore, a detector may be selected which has a substantially flat response over a bandwidth of 10 mHz. centered at the transmitted frequency.

If object 18 moves in a direction towards or away from the antenna, mixer 30 will have applied to it the transmitted wave energy having a frequency $f_0$ through coupler 23–25 (and the reflections from enclosure wall 26) and, further, the wave energy reflected from moving object 18 having a frequency of $f_0 \pm \Delta F$. Accordingly, the generated Doppler signal on lead 31 will have a frequency equal to $\Delta F$, and an amplitude proportional to the vector sum of the amplitude of the wave energies applied to mixer 30.

It may be noted at this point that the amplitude of the Doppler signal is directly depending on certain characteristics of the moving objects since the total energy of the portion of radiated wave energy coupled into mixer 30 through coupler 23–25 and through wave energy reflections from stationary objects and received by the antenna are constant, and the only variable is the energy reflected from the moving object. These characteristics include reflectivity of the particular moving object to the wave energy utilized, and its size, in the case of a parallel radiation pattern and, additionally, its distance from the antenna in case of a divergent radiation pattern. Since the size and reflectivity of all human intruders are roughly the same, the amplitude of the Doppler signal on lead 31 will be inversely proportional to the square of the distance between the transmitter and the intruder for a diverging system. Accordingly, the amplitude of the Doppler signal is indicative primarily of the range of the moving intruder, i.e., the distance from the system, and the frequency of the Doppler signal is primarily indicative of the intruder's velocity in the direction of the antenna.

As already indicated, there are many other sources which may give rise to a frequency shift in the nature of a Doppler effect so that the signal on lead 31 may include not only the frequency due to the motion of object 18, but also frequencies corresponding to natural phenomena or other conditions such as, for example, vibration of enclosure wall 26 due to heavy traffic, high frequency signals due to lighting, and the like. Likewise, there are many other sources which may give rise to amplitude variations not related to variations in the above-described characteristics of moving object 18, such as electrical discharges.

The Doppler signal from mixer 30 is applied to an adjustable range control and bias network 32 by means of which the amplitude of the Doppler signal from the mixer can be adjusted. As will be described presently in connection with the operation of the accumulator 46 and the alarm trigger 48, a certain minimum Doppler signal is required in order to actuate the alarm trigger. Therefore, for each setting ($R_2$) of range control network 32, there is a maximum range beyond which the motion of an average sized intruder will not produce a signal of sufficently large amplitude to actuate alarm trigger 48. Thus, the range control permits adjustment of the maximum distance of coverage of the moving object detection system, and discriminates against motion outside the chosen range.

The Doppler signal from range control and detector bias network 32 is applied to a bandpass amplifier 34 whose function is to pass and amplify only signals in the frequency range which corresponds to velocities of the target within the selected range. In case of a human intruder on foot, the pass band extends approximately from $1f_0/V_E$ Hz. to $6f_0/V_E$ Hz., which, in case of a 10 gHz. wave energy, extends from 10 Hz. to 60 Hz. Bandpass amplifier 34 comprises a high-pass filter amplifier 36 which may have several stages, such as 36 (a), 36 (b) and 36 (c), an emitter follower 38 and a low-pass filter 40. Of course, the high-pass and the low-pass filters may be combined into a single band-pass filter which can be placed either ahead or behind a suitable amplifier.

The range control is located specifically ahead of bandpass amplifier 34 in order to control the amplitude of all signals produced by mixer 30, and to thereby minimize the possibility of defeating the detection system. More specifically, the system is thereby guarded against the generation, outside the area under surveillance, of an RF signal of large amplitude at an RF frequency within the narrow bandwidth response of mixer 30 and having amplitude modulation at a frequency above the cut-off frequency of low-pass filter 40, but within the amplifying range of high-pass filter amplifier 32, which has a sufficiently large amplitude to cause saturation in the amplifier, but which is blocked from actuating the alarm trigger by the low-pass filter. Once such a saturated condition is produced in the high-pass filter amplifier, an intruder could move freely within the volume under surveillance without causing the alarm to trigger since the signal produced by his motion would not be amplified. The range control located at the input to the amplifier minimizes this possibility by controlling the amplitude of all signals before they are supplied to the amplifier.

Figure 2:
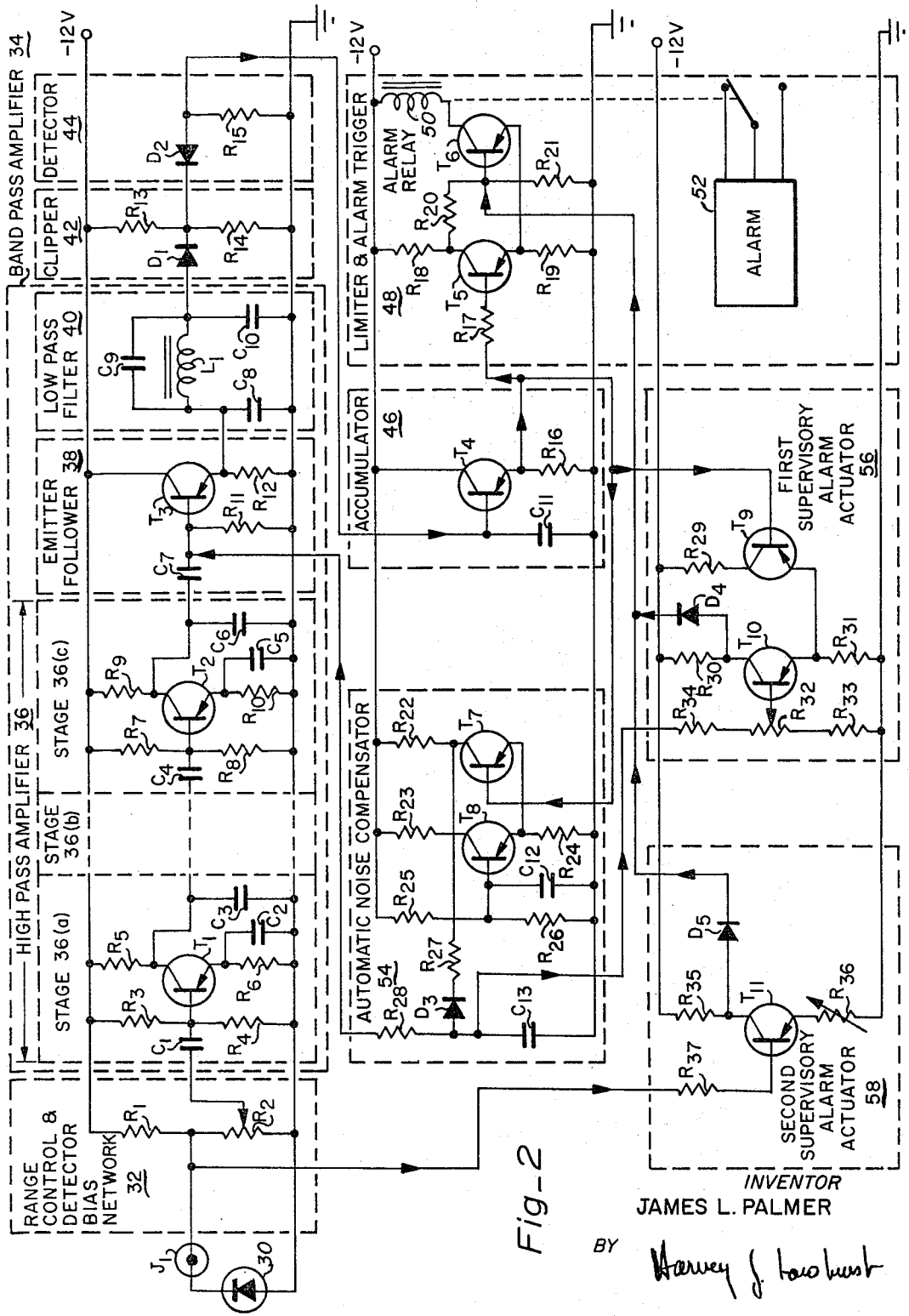
FIGURE 2 is a schematic circuit diagram of the system shown in FIGURE 1 with the wave energy generating and reception means deleted.

Referring now to the schematic circuit diagram of the receiving means 12 shown in FIGURE 2, it is seen that its input stage comprises range control and detector biasing network 32 to control the effective range and to increase the sensitivity of the crystal mixer 30. Network 32 is connected to amplifier 36 through a coupling capacitor $C_1$ whose capacitive impedance is selected to reject all frequencies below the desired bandpass frequencies. Accordingly, capacitor $C_1$ forms the first section of the high-pass filter. The high-pass filter amplifier may have several stages, and only the first, 36 (a), and third 36 (c) are shown, a second stage, 36 (b), being indicated by a dotted line. Each stage of the amplifier is coupled to the succeeding stage through a coupling capacitor, such as $C_4$, whose capacitive impedance is selected, as was the capacitive impedance of $C_1$, to form successive stages of the high-pass filter. In addition, the output of each amplifier stage is bypassed by capacitors $C_3$ and $C_6$ having capacitive impedances selected to produce a slow rolloff with respect to the cut-off frequency of low-pass filter 40. High-pass filter amplifier stage 36 (c) is coupled to emitter follower 38, which functions as an impedance transformation network, through a coupling capacitor $C_7$ which forms the last filter element in the high-pass filter. For an intruder detection system it has been found that four coupling capacitors, such as $C_1$, $C_4$ and $C_7$, each having a capacitive impedance of 50 microfarads, provide a high-pass filter having a cut-off frequency at about 10 cycles per second, and that three bypass capacitors, such as $C_3$ and $C_6$, each having a capacitance impedance of .47 microfarad, provide a high roll-off characteristic.

The output signal from emitter follower 38 is connected to low-pass filter 40 which comprises an M-derived pi-section circuit having two shunt capacitors $C_8$ and $C_{10}$, and a series impedance comprising the parallel combination of capacitor $C_9$ and inductor $L_1$. The impedance of the components of the low-pass filter section are selected in accordance with the desired cut-off frequency at the high end of the pass band, and for an intruder detection system in which the pass band is to extend to 60 Hz., $C_8$ and $C_{10}$ may be selected to be 5 microfarads, $C_9$ is selected to be 3 microfarads and $L_1$ may be selected to be 2 henries.

The amplified and filtered Doppler signal is passed through a clipper means 42 which is set to limit the amplitude of the filtered Doppler signal to some preselected arbitrary maximum level regardless of the actual amplitude. A suitable clipper 42 is shown in FIGURE 2 as comprising a diode $D_1$ which is normally forward biased by a pair of resistors $R_{13}$ and $R_{14}$ connected between ground and a negative supply. The particular clipper illustrated limits the negative excursions of the Doppler signal to a value determined by the negative supply and the ratio between $R_{13}$ and $R_{14}$, and is set such that the negative voltage level is slightly greater than the level required to initiate an alarm as will hereinafter be explained. In this manner, any large amplitude transients in the system will have no greater effect than a normal amplitude signal due to an object within the selected class and moving with a velocity within the selected range.

The Doppler signal from clipper 42 is applied to a second detector 44 which generates a DC voltage proportional to the limited negative excursions of the Doppler signal. A suitable detector is shown in FIGURE 2 and comprises a diode $D_2$ which rectifies the clipped negative portions of the Doppler signal, the unclipped positive portions being disregarded. $R_{15}$ is a suitable biasing resistor for forward biasing rectifier $D_2$.

The rectified Doppler signal from detector 44 is applied to a storage means, such as accumulator 46, which comprises, as shown in FIGURE 2, a capacitor $C_{11}$ followed by an emitter follower formed by transistor $T_4$ and resistor $R_{16}$. The emitter follower presents a high impedance to the accumulator capacitor $C_{11}$. The charging time constant of accumulator 46 is determined by the capacitive impedance of capacitor $C_{11}$, and the resistive impedance of the divider circuit comprising resistor $R_{13}$ and resistor $R_{14}$. The discharge time constant of accumulator 46 is determined by the capacitive impedance of $C_{11}$ and the resistive impedance of resistor $R_{15}$.

Since a moving intruder generates reflective wave energy for some considerable period of time, the detection system of this invention can be made to discriminate against spurious signals by making the alarm system only responsive to a fully charged accumulator, and designing the accumulator to become fully charged only in response to a Doppler signal indicative of a moving intruder, or, speaking generally, by designing the accumulator to be responsive only to an object within the selected class and moving within a selected velocity range. This is accomplished by making the RC time constant sufficiently large so that an intermittent Doppler signal will cause charging at a rate which is less than its discharge rate, but sufficiently small so that it will become fully charged by the Doppler signal produced by an intruder taking one normal step, i.e., a time of approximately one second. If the RC time is made appreciably shorter than one second, the accumulator may become fully charged in response to spurious signals and transients of short duration. If the RC time is made appreciably longer than one second, the system can be defeated by an intruder who pauses between steps long enough to permit discharging of the accumulator. It has been found for an intruder detection system that a ratio greater than 2:1 and preferably between 5:1 and 10:1 between the RC discharge time constant and the RC charging time constant is entirely satisfactory. Accordingly, $R_{13}$ and $R_{14}$ may be selected to respectively have an impedance of 12 and 8.2 kilohms and capacitor $C_{11}$ may be selected to have a capacitive impedance of 75 microfarads, in which case the RC time constant of accumulator 46 is approximately equal to .75 second, and $R_{15}$ may be selected to have an impedance of 100 kilohms which, in conjunction with the capacitive impedance of $C_{11}$ and the base impedance of $T_4$, produce a discharge time of approximately 5 seconds.

The output signal from accumulator 46 is applied to an alarm trigger circuit 48 which comprises a Schmitt trigger having a normally "on" transistor $T_6$ and a normally "off" transistor $T_5$. An alarm relay 50 is connected in the collector circuit of the normally "on" transistor $T_6$, and the circuit is triggered by application of the signal from accumulator 46 to the normally "off" transistor $T_5$. The emitter electrodes of both transistors $T_5$ and $T_6$ are connected to ground through a common emitter resistor $R_{19}$ so that the saturation current of the normally "on" transistor $T_6$ flowing through common resistor $R_{19}$ sets the voltage level at which a voltage supplied to the base electrode of the normally "off" transistor $T_5$ will trigger the circuit and initiate an alarm device 52.

The voltage level at which circuit 48 triggers alarm 52, together with the quiescent voltage of accumulator 46, forms an amplitude discriminating network which prevents actuation of the alarm unless the pulses applied to accumulator 46 exceed a predetermined voltage level. This provides discrimination against actuation of the moving object detection system of this invention unless the amplitude of the Doppler signal exceeds a selected minimum amplitude. For example, when a dog or other small animal enters the protected area, and assuming that its velocity is within the selected range, which is a distinct possibility, the alarm would not be triggered if this limiting level is set above a Doppler signal amplitude indicative of a target smaller than a human intruder.

There is also provided an automatic noise or background compensator means 54 which is connected between the output of accumulator 46 and emitter follower 38, and which applies a correction voltage to the emitter follower. Automatic noise compensator 54 samples the voltage level of the emitter of transistor $T_4$, which is proportional to the energy stored in the accumulator, and compares this level, by means of a differential amplifier comprised of transistors $T_7$ and $T_8$, with a selected constant voltage level maintained on the base of transistor $T_8$ by voltage divider $R_{25}$ and $R_{26}$. Whenever the voltage level of the accumulator output voltage differs from the selected constant level which is the quiescent level of the accumulator without noise, an error or correcting voltage appears at the collector of transistor $T_7$.

This correcting voltage is impressed on the base of emitter follower 38 through an RC network consisting of $R_{27}$, $R_{28}$, $R_{11}$, $D_3$ and $C_{13}$. This correcting voltage is, in turn, applied to the accumulator through filter 40, clipper 42 and detector 44 causing a readjustment of the accumulator voltage level until it equals exactly the selected constant level maintained on the base of transistor $T_8$. The ratio of resistive impedance of $R_{11}$ to that of $R_{27}$ and $R_{28}$ is chosen so that, in the quiescent condition when no error voltage is being generated, transistor $T_7$ is nearly cut off, transistor $T_8$ is nearly saturated, and diode $D_3$ is conducting and representing a low impedance compared to either $R_{27}$ or $R_{28}$.

When a constant low level signal is received such as might be caused by spurious noise or random motion of objects by wind, etc., but which is of insufficient amplitude to fully charge accumulator 46, the base of transistor $T_7$ is driven more negative by the increasing negative charge in the accumulator. Because of the high gain of the differential amplifier comprised of $T_7$ and $T_8$, transistor $T_7$ is driven into saturation and transistor $R_8$ is driven into cut-off. The collector of transistor $T_7$ thereby reduces to a more positive voltage level than that of capacitor $C_{13}$ causing diode $D_3$ to become reverse biased. Capacitor $C_{13}$ then discharges through the resistive divider consisting of $R_{28}$ and $R_{11}$.

The reaction time of the automatic noise compensator is, therefore, determined by the resistive impedance of $R_{11}$ and $R_{28}$ and the capacitive impedance of capacitor $C_{13}$. This correction process continues as capacitor $C_{13}$ discharges, and the base of emitter follower 38 is driven more positive, i.e., towards ground, until the sum of this base voltage and the average noise amplitude at the output of the amplifier is exactly equal to the quiescent voltage of the accumulator as established by the constant voltage maintained on the base of transistor $T_8$ by the resistive divider $R_{25}$ and $R_{26}$.

In the event that the above assumed noise is suddenly removed, detector 44 will become reverse biased, the charge stored in the accumulator will decay through resistor $R_{15}$, and the base of transistor $T_7$ will be driven more positive, i.e., toward ground, cutting off transistor $T_7$ and saturating transistor $T_8$. Capacitor $C_{13}$ then recharges to its quiescent level through diode $D_3$ and resistive impedances $R_{27}$ and $R_{22}$. The restoring time is, therefore, determined by the resistive impedance of $R_{27}$ and $R_{22}$ and capacitive impedance of capacitor $C_{13}$ and can be selected independently of the reaction time.

The reaction time of automatic noise compensator 54, i.e., the time required to readjust the voltage level of the accumulator in the presence of a low level noise signal to the quiescent level, must necessarily be large compared to the accumulator charging time; however, it is also desirable to have a short reaction time in order to compensate as rapidly as possible a sudden increase in noise. In practice, the former criterion outweighs the latter since otherwise the system is self-defeating. The restoring time, the time required to readjust the voltage level of the accumulator to the quiescent level, when a noise signal is suddenly removed, is independent of the reaction time, and it should be long compared to the discharge time of the accumulator in order to obtain a good average of charge stored in the accumulator, and it should be comparable to the discharge time of the accumulator in order to insure that the system restores rapidly after a sudden reduction of noise without a long period of insensitivity. In practice, the latter criterion outweighs the former since the system must not be subject to defeat.

Under conditions of extremely high noise levels such as might be encountered in outdoor operation during intense storm conditions, it is possible for the noise to saturate the automatic noise compensator and to then charge the accumulator to the trigger level resulting in a false alarm. This mode of operation may be undesirable in certain applications in which it may be preferable to have the noise saturate the entire system resulting in temporarily interrupting normal system operation without causing a false alarm. This alternate mode of operation can be easily obtained by selecting the resistive impedances of amplifier stage 36 (c), so that its peak amplitude output under saturation conditions is slightly less than the difference between the voltage required on the accumulator to actuate the alarm trigger and the DC voltage level on the base of emitter follower 38 when the automatic noise compensator is fully saturated. It has been found for this alternate mode of operation that suitable values for $R_7$, $R_8$, $R_9$ and $R_{10}$ are respectively 68 kilohms, 27 kilohms, 10 kilohms and 8.2 kilohms.

There is further provided a first supervisory alarm actuator circuit 56 and a second supervisory alarm actuator circuit 58 which continuously monitors the performance of the system and actuates alarm trigger 48 whenever certain characteristics of the system are not maintained.

Actuator 56 is connected to accumulator 46 and compensator 54 and monitors the system noise level by comparing the voltage level of accumulator 46 with that of automatic noise compensator 54. The output signal from actuator 56 is connected to alarm trigger 48 to actuate the alarm trigger whenever a minimum noise level, which is manifested by a minimum voltage difference between the two levels from the accumulator and the compensator, is not maintained. With the system operating and all elements functioning properly, there will be a minimum noise level at the output of the amplifier which originates from a multitude of sources, i.e., from the transmitter 10, spurious noise and random motion in the volume under surveillance, from the detector 30 or amplifier 36, etc. If a major element of the system fails the noise level at the output of amplifier 34 will decrease resulting in triggering of the alarm.

Supervisory alarm actuator 56 functions as follows: With the system in normal operation and range control $R_2$ set at the appropriate value for the volume under surveillance, the voltage on the base of transistor $T_{10}$ is adjusted by means of potentiometer $R_{32}$ until transistor $T_{10}$ is barely cut off and transistor $T_9$ is saturated. Under this condition diode $D_4$ is reverse biased, and alarm trigger 48 functions in the normal manner. An increase in noise or the presence of a low amplitude Doppler signal will only serve to discharge capacitor $C_{13}$ which, through resistive divider $R_{34}$, $R_{32}$ and $R_{33}$, drives the base of transistor $T_{10}$ more positive, an action having no effect since transistor $T_{10}$ is already cut off. A decrease in noise, however, causes automatic noise compensator 54 to charge capacitor $C_{13}$ more negative, which in turn drives the base of transistor $T_{10}$ more negative, driving it into saturation and driving transistor $T_9$ into cut-off. Under this condition, diode $D_4$ becomes forward biased and drives the base of transistor $T_6$ more positive. This action cuts off transistor $T_6$ which turns off alarm relay 50 causing an alarm.

Supervisory alarm actuator 58 is connected between the output of detector 30 and alarm trigger 48, and supervises the operation of the two most critical elements in the system, namely, that of transmitter 10 and detector 30. When transmitter 10 and detector 30 are functioning properly, the voltage output of detector 30 drives point $J_1$ slightly positive, which drives the base of transistor $T_{11}$, through resistor $R_{37}$, slightly positive producing cut-off in transistor $T_{11}$. Diode $D_5$ is thereby reverse biased, and alarm trigger 48 functions normally without interference from supervisory alarm actuator 58. In the event of a failure of detector 30 or a substantial reduction in transmitter power, point $J_1$ is driven negative by detector bias network 32 which drives the base of transistor $T_{11}$ negative, thereby driving it into saturation. Under this condition, diode $D_5$ becomes forward biased and drives the base of transistor $T_6$ more negative. This action cuts off transistor $T_6$, turns off alarm relay 50 causing an alarm. Potentiometer $R_{36}$ is used to adjust the voltage required at $J_1$ to saturate transistor $T_{11}$ and actuate the alarm trigger.

The two supervisory alarm actuators 56 and 58 are independent of each other and operate on entirely different principles. When the supervised elements are functioning properly, both supervisory circuits are isolated from interference with the alarm trigger by reverse biased diodes. Each supervisory circuit has an independently adjustable level at which actuation of the alarm trigger takes place.

Referring now to motion simulator 24 connected between transmit antenna 14 and receiving antenna 20, the same incorporates means for modulating the portion of the transmitter energy which is coupled directly into the receiver by transmission lines 23 and 25 with a frequency equal to the Doppler frequency of an object moving with a velocity within the selected velocity range of the system, and having an adjustable amplitude so that for each setting of the range control the amplitude of modulation may be adjusted to just actuate the alarm trigger. Motion simulator 24 thereby permits a quantitative as well as qualitative test of the entire system.

Modulation of the portion of the transmitter energy coupled into the receiver by transmission lines 23 and 25 may be accomplished by a variety of methods such as mechanically chopping or interrupting the transmission line, or by inserting and withdrawing at the modulation frequency a suitable impedance between transmission lines 23 and 25, or by mechanically shunting at the modulation frequency the transmission line with a suitable impedance, or by inserting into the transmission line at the modulating frequency a suitable reflecting obstacle.

Suitable modulation of the portion of the transmitter energy coupled into the receiver by transmission lines 23 and 25 may also be achieved by electronic means, for example, by shunting the transmission line with a microwave diode and applying a suitable combination of reverse bias and AC modulation across the diode so as to vary at the modulation frequency the impedance presented by the diode to the transmission line, or by the use of a thermistor element either shunting the transmission line or in series with the transmission line and applying a suitable combination of bias current and AC modulation across the thermistor so as to vary at the modulation frequency the impedance presented by the thermistor to the transmission line. The control of such modulation can, of course, be accomplished from a remote location by a suitable means, and system performance may be tested periodically to insure proper operation.

A primary advantage of this means of motion simulation is that the entire system consisting of transmitter, receiver and motion simulator can be mounted as an integral unit within a single enclosure.

This means of motion simulation offers the additional advantage of not requiring modulation of the energy radiated by transmitting antenna 14 which conforms with the requirement of CW operation without modulation of any kind when operating in certain RF frequency bands.

In operation of the moving object detection system of this invention and particularly as applied to the detection of an intruder, the microwave transmitting and receiving antennas 14 and 20, which are designed and mounted so as to produce overlapping patterns of transmission and reception, are arranged so that the pattern covers the precise volume under surveillance. Any intruder entering the volume under surveillance will reflect a portion of the radiated signal back into receiving antenna 20 where it is impressed upon mixer 30. The portion of the radiation reflected from the intruder will be shifted in frequency from that of the originally transmitted signals. In the illustrative example, the operating frequency of the transmitted radiation is 10,000 mHz. which produces a frequency shift of approximately 20 Hz. for each foot per second of motion of the intruder in a direction substantially parallel to the axis of radiation.

Mixer 30 mixes a portion of the radiated signal with the signals received by antenna 20, and derives the Doppler signal which has frequencies equal to the differences in frequencies of the various signals picked by receiving antenna 20 from the radiated frequency, and amplitudes proportional to their vector sum. The signals picked up by antenna 20 include not only the signals reflected by moving objects, but also reflections from stationary objects in the volume under surveillance, such as walls, ceiling, floor, equipment, furniture and the like, and spurious signals of many kinds having RF frequencies within and only within the bandwidth of mixer 30. The signal reflected from truly stationary objects will have a frequency which will be the same as the radiated signal and, therefore, the frequency shift is zero and no Doppler signal results. The only effect the reflections will have on the system is a change in amplitude of the zero frequency shift signal, as represented by the coupled radiated signal which, being constant, will not influence the system.

Further, antenna 20 will pick up spurious signals due to many causes, natural or man made. These include lighting, electrical discharge, fans, blowers and the like.

The narrow RF bandwidth of mixer 30 provides the first means of discrimination by restricting the response of the system to a very narrow RF bandwidth centered at the transmitter frequency. In practice it is found that the transmitter frequency can be maintained constant within 10 mHz. for all variations in power line voltage, temperature, age, etc. Accordingly, the RF bandwidth of mixer 30 is 10 mHz. and is centered at the transmitter frequency. At frequencies outside the RF bandwidth of mixer 30, the response decreases sharply rendering the system insensitive to many spurious signals. A response by the receiver to signals either natural or man made occurring at frequencies outside this narrow RF bandwidth is thereby prevented, and the system effectively discriminates against nearly all spurious signals.

The discriminaton provided by the Doppler signal processing means safeguards against an alarm indication from all but moving objects belonging to a selected class and moving with a velocity within a selected range. The bandpass filter amplifier 32 provides the second means of discrimination by suppressing all frequencies of the Doppler signal which do not correspond to objects moving within a velocity within the selected range, which is from one-half to three feet per second in the case of an intruder. Accordingly, the filtered Doppler signal passed by the filter includes only information of such moving objects and perhaps spurious RF frequencies within the bandwith of mixer 30 and having amplitude modulation with frequencies between 10 and 60 Hz.

Clipper 42 provides the third means of discrimination by limiting the amplitude of the filtered Doppler signal to a first or maximum level which is above the minimum level required to charge accumulator 46 to actuate alarm trigger 48. Optimized system performance would be achieved if the limiting or clipping level coincided with or were only slightly above the minimum level of the accumulator required to actuate the alarm trigger. This would cause all signals regardless of their amplitude above the minimum level to have nearly the same effectiveness in charging the accumulator. From a practical viewpoint, however, the time required to charge the accumulator would be critically dependent on the small difference between these two levels and many other parameters of the system. In order to reduce the critical nature of this circuit, the limiting or clipping level is set up, as a practical matter, to clip an amplitude which is between 10% and 60% above the minimum amplitude of the Doppler signal required to actuate the alarm trigger. Of course, maximum discrimination against different size targets is achieved by making the clipping level as close as possible to the minimum trigger amplitude, and for certain applications outside the intruder detection field, the clipping level may practically be reduced below 10%. It may be noted that this discrimination means thereby is made to ignore the fact that multiple intruders are present which is exactly as it should be, since multiple intruders should have no larger effect on the system than a single intruder.

Detector 44 rectifies the filtered and clipped Doppler signal for accumulation in a slow leakage rate accumulator 46. The accumulator provides the fourth means of discrimination by preventing all short duration signals from charging the accumulator. This is accomplished by providing for a different charging and discharging rate, and making the charging rate sufficiently slow so that short duration signals do not fully charge the accumulator, but not slow enough so that the intruder can evade the system. For an intruder detection system, a charging time constant of 0.75 second is selected on the basis that the accumulator charges to the level required to actuate the alarm trigger during less time than required for an intruder to take one normal step. An interrupted or intermittent or spurious Doppler signal of duration less than 0.75 second will be unable to charge the accumulator, a condition which must be met before the alarm is triggered. To permit discrimination between sustained intermittent signals, a discharge time constant of approximately 5 to 10 times the charging time constant is selected.

Trigger 48 provides the fifth means of discrimination by setting the same so that only a detected Doppler signal having an amplitude above a second level will actuate the alarm trigger. The second level is selected so that the rectified Doppler signal produced by an intruder moving at the maximum range with the range control set to maximum will be 10% above the minimum level required to trigger the alarm. In practice, it has been found that excellent discrimination against small animals and random motion of objects due to air currents and the like is obtained because of less reflection from such objects than from a person.

The third and fifth discriminations may be considered together as a means for passing only Doppler signals having an amplitude above the minimum level and having its peaks clipped to the maximum level. This is much like the opening in a dam whose height above the ground and height of opening controls flow.

Automatic noise compensator 54 provides the sixth means of discrimination by continuously readjusting the voltage level of the accumulator to a preselected level below the trigger level of alarm trigger 48, the correcting voltage being proportional to the noise level at the accumulator averaged over a reaction time long compared with the accumulator charging time. This means effectively discriminates against the slow build-up or continuous action of noise or spurious signals such as might result from the presence in the volume of surveillance of small fans, motors and other objects in continuous motion, or of slowly changing random motion of objects in the wind such as leaves and bushes, etc. In practice, the optimum reaction time may vary from installation to installation depending upon the ambient noise level and random motion present; however, it has been found that a reaction time of 10 to 50 times the accumulator charging time is satisfactory for nearly all installations, i.e., a minimum reaction time of 7.5 seconds and a maximum reaction time of 37.5 seconds to correct fully the accumulator voltage level when it is driven by a noise signal 10% above the minimum level required to actuate the alarm trigger. The restoring time, the time required to re-establish the voltage level of the accumulator to the quiescent level when a noise signal is suddenly removed, is independent of the reaction time, and it is chosen to be 2 to 5 times the discharge time of the accumulator, i.e., a minimum restoration time of 10 seconds and a maximum of 25 seconds.

By way of example, the following values of the various circuit components shown in FIGURE 2 have been satisfactorily employed in practicing the present invention for the detection of an intruder, and provide for the initiation of an alarm when the voltage applied to an accumulator (second level) is equal to one volt within the frequency band of interest:

| | Ohms |
|---|---:|
| $R_1$ | 82,000 |
| $R_2$ | 1,000 |
| $R_3$ | 150,000 |
| $R_4$ | 10,000 |
| $R_5$ | 10,000 |
| $R_6$ | 1,000 |
| $R_7$ | 120,000 |
| $R_8$ | 10,000 |
| $R_9$ | 10,000 |
| $R_{10}$ | 1,000 |
| $R_{11}$ | 82,000 |
| $R_{12}$ | 3,300 |
| $R_{13}$ | 12,000 |
| $R_{14}$ | 8,200 |
| $R_{15}$ | 100,000 |
| $R_{16}$ | 10,000 |
| $R_{17}$ | 2,200 |
| $R_{18}$ | 2,200 |
| $R_{19}$ | 1,200 |
| $R_{20}$ | 82,000 |
| $R_{21}$ | 220,000 |
| $R_{22}$ | 8,200 |
| $R_{23}$ | 8,200 |
| $R_{24}$ | 3,300 |
| $R_{25}$ | 82,000 |
| $R_{26}$ | 27,000 |
| $R_{27}$ | 27,000 |
| $R_{28}$ | 180,000 |
| $R_{29}$ | 8,200 |
| $R_{30}$ | 8,200 |
| $R_{31}$ | 2,200 |
| $R_{32}$ | 150,000 |
| $R_{33}$ | 150,000 |
| $R_{34}$ | 470,000 |
| $R_{35}$ | 8,200 |
| $R_{36}$ | 100 |
| $R_{37}$ | 10,000 |

| | Microfarads |
|---|---:|
| $C_1$ | 50 |
| $C_2$ | 150 |
| $C_3$ | 0.47 |
| $C_4$ | 50 |
| $C_5$ | 150 |
| $C_6$ | 0.47 |
| $C_7$ | 50 |
| $C_8$ | 5 |

| | Microfarads |
|---|---|
| $C_9$ | 3 |
| $C_{10}$ | 5 |
| $C_{11}$ | 75 |
| $C_{12}$ | 3 |
| $C_{13}$ | 150 |
| $T_1$ | 2N2613 |
| $T_2$ | 2N2614 |
| $T_3$ | 2N2614 |
| $T_4$ | 2N2614 |
| $T_5$ | 2N404 |
| $T_6$ | 2N404 |
| $T_7$ | 2N2614 |
| $T_8$ | 2N2614 |
| $T_9$ | 2N2614 |
| $T_{10}$ | 2N2614 |
| $T_{11}$ | 2N2614 |
| $L_1$ henries | 2 |
| $D_1$ | 1N295 |
| $D_2$ | 1N295 |
| $D_3$ | 1N295 |
| $D_4$ | 1N295 |
| $D_5$ | 1N295 |

There has been described a Doppler system for the detection of moving objects which includes a Doppler signal processing means which effectively discriminates against all but objects within a selected class and moving with a velocity within a selected range. The processing means removes any indication of objects moving with velocities lying outside the selected range, and discriminates sharply against non-continuous occurrences. Further, discrimination is provided against small signals which are less than those expected from objects falling into the selected class and against large signals due to spurious causes.

What is claimed is:

1. A detection system for detecting the presence of an object belonging to a selected class of objects when such objects move with a velocity within a selected velocity range within a volume under surveillance, said detection system comprising, in combination:
   a Doppler system having an effective radiation field covering the volume under surveillance for producing a Doppler signal having Doppler frequencies indicative of the velocities of any objects within the volume under surveilance and independent of the position of any such objects and amplitudes indicative of the concurrent field strength of the reflected signals received from any such objects;
   frequency discrimination means responsive to said Doppler signal for discriminating between frequencies of said Doppler signal corresponding to objects moving with velocities within said selected range and frequencies of said Doppler signal corresponding to objects moving with velocities without said selected range, and operative to provide a filtered Doppler signal having frequencies corresponding only to objects moving with velocities within said selected range; and
   alarm circuit means responsive to said filtered Doppler signal and operative to initiate an alarm indication in response to said filtered Doppler signal.

2. A detection system as set forth in claim 1 for detecting the intrusion of a person in which said frequency discrimination means is constructed to pass only frequencies corresponding to objects moving with velocities substantially parallel to such radiation field within a range extending approximately from one-half foot per second to three feet per second.

3. A detection system as set forth in claim 1 in which said alarm circuit means includes an amplitude discrimination means for discriminating between amplitudes of said filtered Doppler signal above a given minimum level and amplitudes of said filtered Doppler signal below said minimum level and for initiating an alarm indication only in response to said filtered Doppler signal having an amplitude above said given minimum level, said minimum level being selected in accordance with the selected class of objects and the volume under surveillance.

4. A detection system as set forth in claim 1 in which said alarm circuit means further includes an amplitude clipping means for limiting the amplitude excursions of said filtered Doppler signal to a given maximum level selected in accordance with the selected class of objects.

5. A detection system as set forth in claim 1 in which said alarm circuit means includes an amplitude clipping means for limiting the amplitude excursions of said filtered Doppler signal to a maximum level, and an amplitude discrimination means for discriminating between amplitudes of said clipped Doppler signal above a given minimum level and amplitudes of said clipped Doppler signal above a given minimum level and amplitudes of said clipped Doppler signal below said given minimum level and for initiating an alarm indication only in response to said clipped Doppler signal having an amplitude above said given minimum level, said maximum level being selected in accordance wtih said given minimum level and said minimum level being selected in accordance with the selected class of objects and the volume under surveillance.

6. A detection system as set forth in claim 5 for the detection of a person in which said maximum level is between 1.1 times and 1.6 times of said given minimum level.

7. A detection system as set forth in claim 1 in which said alarm circuit means includes an amplitude clipping means for limiting the amplitude excursions of said filtered Doppler signal to a given maximum level, an accumulator means responsive to said clipped Doppler signal and operative to store said clipped Doppler signal, and an alarm indicator means responsive to said stored Doppler signal and operative to provide said alarm indication.

8. A detection system as set forth in claim 7 in which said alarm circuit means further includes amplitude discrimination means disposed between said accumulator means and said alarm indicator means for discriminating between amplitudes of said clipped Doppler signal above a given minimum level and amplitudes of said clipped Doppler signal below said minimum level and for initiating an alarm indication only in response to a clipped Doppler signal having amplitudes above said minimum level.

9. A detection system as set forth in claim 7 in which said accumulator means includes an RC time constant network which has a charging time constant which is less than the minimum time of the normally anticipated uninterrupted motion of the object to be detected when said object moves with a velocity within said selected range and greater than one-half of the said minimum time.

10. A detection system as set forth in claim 9 for detecting the intrusion of a person in which the charging time constant is less than one second and greater than one-half second.

11. A detection system as set forth in claim 9 in which said accumulator means further has a discharging time constant which is at least twice as large as the charging time constant.

12. A detection system as set forth in claim 11 for detecting the intrusion of a person in which the charging time constant is less than one second and greater than one-half second, and the discharging time constant is approximately five to ten times larger than the charging time constant.

13. A detection system for detecting the presence of an object belonging to a selected class of objects when such objects move with a velocity within a selected velocity range within a volume under surveillance, said detection system comprising, in combination:
   a Doppler system having an effective radiation field covering the volume under surveillance for producing a Doppler signal having Doppler frequencies indicative of the velocities of any objects within the volume under surveillance and independent of the position of any such objects and amplitudes indicative of the concurrent field strength of the reflected signals received from any such objects;

frequency discrimination means responsive to said Doppler signal for discriminating between frequencies of said Doppler signal corresponding to objects moving with velocities within said selected range and frequencies of said Doppler signal corresponding to objects moving with velocities without said selected range, and operative to provide a filtered Doppler signal having frequencies corresponding only to objects moving with velocities within said selected range;

amplitude clipping means responsive to said filtered Doppler signal and operative to limit the amplitude Doppler signal excursions of said filtered Doppler signal to a maximum level which is a selected amount above a corresponding given minimum level;

accumulator means having a selected charging time constant and a selected discharging time constant, said accumulator means being responsive to said clipped Doppler signal and operative to provide a stored Doppler signal; and alarm indicator means responsive to said stored Doppler signal and operative to initiate an alarm indication when said stored Doppler signal reaches said given minimum level, the charging time constant of said accumulator means being selected to be less than the minimum time of a normally anticipated uninterrupted motion of the object to be detected and greater than one-half of such minimum time, and the discharging time constant of said accumulator means being selected to be at least twice the charging time constant of said accumulator means.

14. A detection system as set forth in claim 13 which further includes a noise compensation means responsive to an indication of the immediately past history of the signal stored in said accumulator means and operative to maintain a constant difference between the past history level of said accumulator means and said given minimum level.

15. A detection system as set forth in claim 13 which further includes noise compensation means responsive to the immediate past signal stored in said accumulator means and operative to provide a noise error voltage for maintaining the quiescent level of said accumulator a constant amount below said given minimum level.

16. A detection system as set forth in claim 15 in which said noise compensation means includes a time constant network which has a charging time constant and a discharging time constant which are selected in accordance with the charging time constant of said accumulator means.

17. A detection system as set forth in claim 16 in which the charging time constant of said noise compensation means is selected longer than ten times and shorter than fifty times the charging time constant of said accumulator means.

18. A detection system as set forth in claim 17 in which the discharging time constant of said noise compensation means is selected greater than twice and less than five times the charging time constant of said accumulator means.

19. A detection system as set forth in claim 14 in which said noise compensation means is operative to maintain said constant difference between said past history level of said accumulator means and said given minimum level only for immediate past signals below a given maximum amplitude, and where said detection system further includes a further clipping means disposed between said Doppler system and said amplitude clipping means, said further clipping means limiting the amplitude of said Doppler signal to a maximum level which is less than the sum of said given maximum amplitude and said constant difference between the past history level of said accumulator means and said given minimum level.

20. A detection system as set forth in claim 13 which further includes a first supervisory alarm detecting means responsive to an indication of the noise stored in said accumulator means, and operative to include an alarm indication in said alarm indicator means in the absence of any noise.

21. A detection system as set forth in claim 15 which further includes a first supervisory alarm detecting means connected between said noise compensating means and said alarm detector means, said first supervisory means being responsive to the position of the quiescent level of said accumulator means and operative to initiate an alarm indication in the absence of an indication of a noise error voltage.

22. A detection system as set forth in claim 13 which includes an adjustable range control means disposed between said Doppler system and said frequency discrimination means by which the detection range of the system can be adjusted, said range control means including voltage divider means whereby an adjustable portion of the Doppler signal developed by said Doppler system is applied to said frequency discrimination means.

23. A detection system as set forth in claim 13 which further includes a second supervisory alarm detection means connected between said Doppler signal and said alarm indicator means, said second supervisory means being responsive to the output signal from said Doppler system and operative to initiate an alarm indication in the absence of such an output signal.

24. A detection system as set forth in claim 13 in which said Doppler system includes a source of wave energy, a receiver of wave energy and a direct coupling means for applying a portion of the wave energy from said source to said receiver, said direct coupling means including a motion simulator means for amplitude modulating the wave energy passing through said coupling means to provide a modulated signal having a selected amplitude and frequency, said modulated signal simulating a Doppler signal.

References Cited

UNITED STATES PATENTS

| | | | |
|---|---|---|---|
| 3,331,065 | 7/1967 | McDonald | 343—5 |
| 3,276,006 | 9/1966 | Hansen | 340—258 X |
| 3,270,339 | 8/1966 | McEuen et al. | 343—5 |
| 3,242,486 | 3/1966 | Corbell | 343—5 |
| 3,189,883 | 6/1965 | Lucas et al. | 340—258 X |
| 2,708,746 | 5/1955 | Shaw. | |

RODNEY D. BENNETT, *Primary Examiner.*

RICHARD A. FARLEY, *Examiner.*

C. L. WHITMAN, *Assistant Examiner.*

PO-1050
(5/69)

UNITED STATES PATENT OFFICE
CERTIFICATE OF CORRECTION

Patent No. __3,383,678__  Dated __May 14, 1968__

Inventor(s) __J. L. Palmer__

It is certified that error appears in the above-identified patent and that said Letters Patent are hereby corrected as shown below:

Column 16, line 16, cancel beginning with "amplitude" to and including "level and" column 16, line 17. Column 18, line 21, change "compensating" to --compensation--. Column 18, line 22, change "detector" to --indicator--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents